United States Patent
Yano

(10) Patent No.: US 9,858,914 B2
(45) Date of Patent: Jan. 2, 2018

(54) ACCELERATION DETECTOR AND ACTIVE NOISE-CONTROL DEVICE

(71) Applicant: MITSUBISHI ELECTRIC CORPORATION, Tokyo (JP)

(72) Inventor: Atsuyoshi Yano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/113,688

(22) PCT Filed: Feb. 21, 2014

(86) PCT No.: PCT/JP2014/054174
§ 371 (c)(1),
(2) Date: Jul. 22, 2016

(87) PCT Pub. No.: WO2015/125275
PCT Pub. Date: Aug. 27, 2015

(65) Prior Publication Data
US 2017/0004816 A1 Jan. 5, 2017

(51) Int. Cl.
*G10K 11/178* (2006.01)
*G01H 1/00* (2006.01)
*G01P 15/18* (2013.01)

(52) U.S. Cl.
CPC ............ *G10K 11/178* (2013.01); *G01H 1/00* (2013.01); *G01P 15/18* (2013.01); *G10K 11/1784* (2013.01); *G10K 2210/128* (2013.01); *G10K 2210/129* (2013.01); *G10K 2210/1282* (2013.01)

(58) Field of Classification Search
None
See application file for complete search history.

(56) References Cited

U.S. PATENT DOCUMENTS

| 5,416,845 A | 5/1995 | Shen |
| 7,516,038 B2 | 4/2009 | Lehtonen et al. |
| 8,077,873 B2 | 12/2011 | Shridhar et al. |

(Continued)

FOREIGN PATENT DOCUMENTS

| JP | 6-110474 A | 4/1994 |
| JP | 8-509823 A | 10/1996 |
| JP | 2009-508133 A | 2/2009 |

(Continued)

OTHER PUBLICATIONS

"Active Noise Control", M. Nishimura, T. Usagawa, S. Ise, Corona Publishing Co. Ltd., Jul. 7, 2006, pp. 74-77.

*Primary Examiner* — Curtis Kuntz
*Assistant Examiner* — Kenny Truong
(74) *Attorney, Agent, or Firm* — Birch, Stewart, Kolasch & Birch, LLP

(57) ABSTRACT

An acceleration detector 10 includes a direction vector setting unit 11 for setting a direction vector u in accordance with detection arguments a and b that define a target detection direction in a three-axis rectangular coordinate system of xyz orthogonal to each other; and an inner product computing unit 12 for obtaining a detected acceleration signal v(n) by calculating an inner product of the direction vector u and acceleration signals x(n), y(n) and z(n) on the individual axes observed in the rectangular coordinate system.

8 Claims, 4 Drawing Sheets

(56) References Cited

U.S. PATENT DOCUMENTS

2007/0062286 A1* 3/2007 Lehtonen ................ G01P 15/18
73/514.32
2011/0142248 A1* 6/2011 Sakamoto .......... G10K 11/1784
381/71.4

FOREIGN PATENT DOCUMENTS

| JP | 2009-128164 A | 6/2009 |
| JP | 2012-112793 A | 5/2010 |
| JP | 5222897 B2 | 6/2013 |

* cited by examiner

US 9,858,914 B2

ACCELERATION DETECTOR AND ACTIVE NOISE-CONTROL DEVICE

TECHNICAL FIELD

The present invention relates to an acceleration detector that detects the acceleration of a vibration noise source, and to an active noise-control device that silences the vibration noise by active noise control by referring to the acceleration detected.

BACKGROUND ART

To silence vibration noise due to vibration of a vibration noise source such as a machine and vehicle by the active noise control, a technique is disclosed which mounts an acceleration sensor on the vibration noise source, and refers to the acceleration detected (see Patent Document 1, for example).

However, the vibration of an object is not always limited to a single direction of motion, but has a plurality of vibration components of different directions of motion such as vertical and horizontal directions. At this time, it is conceivable due to design reasons that the direction of motion of the vibration to be detected does not always agree with the axis of the acceleration sensor (that is, the detection direction of the acceleration). Considering such a case, a technique is disclosed which measures deviation of the axis of the acceleration sensor from the direction of motion of the vibration to be detected, and corrects the output value of the acceleration sensor in accordance with the deviation (see Patent Document 2, for example).

The technique of the Patent Document 2, however, cannot deal with the case where the deviation between the direction of motion of the vibration that contributes to the noise and the axis of the acceleration sensor is not fixed and varies depending on conditions. With respect to the problem, a Patent Document 3, for example, discloses a technique that measures the direction of motion from an arctangent based on a ratio between the accelerations of the individual axes using an acceleration sensor that detects the accelerations of two axes orthogonal to each other.

PRIOR ART DOCUMENT

Patent Document

Patent Document 1: Japanese Patent Laid-Open No. 6-110474/1994.
Patent Document 2: Japanese Patent Laid-Open No. 2010-112793.
Patent Document 3: Japanese Patent Laid-Open No. 2009-128164.

DISCLOSURE OF THE INVENTION

Problems to be Solved

A complicated construction such as a machine or vehicle has innumerable modes of vibration, and the individual modes of vibration have various directions of motion and frequencies. Accordingly, the acceleration signals on the individual axes offers a problem of having various vibration components mixed as disturbance besides the vibration component mainly contributing to the noise.

In such a case, it is necessary to detect only the vibration component mainly contributing to the noise accurately while curbing the influence of the vibration components of the disturbance. However, none of the foregoing Patent Documents 1-3 disclose such a technique. For example, a technique of the Patent Document 3 measures only the direction of motion and the acceleration every moment in accordance with a composite result of the target vibration and the disturbance. Thus, applying the technique to the active noise control offers a problem of reducing the silencing effect owing to the influence of the disturbance.

The present invention is implemented to solve the foregoing problems. Therefore it is an object of the present invention to detect the direction or acceleration of the vibration contributing to the noise direction first, and second to silence the vibration noise effectively.

Means for Solving the Problems

An acceleration detector in accordance with the present invention is one that receives acceleration signals on individual axes observed in a three-axis or two-axis rectangular coordinate system whose individual axes are orthogonal to each other, and that outputs a detected acceleration signal converted to a target detection direction, the acceleration detector comprising: a direction vector setting unit to set a direction vector in accordance with a detection argument that defines the target detection direction in the rectangular coordinate system; an inner product calculator to obtain the detected acceleration signal by calculating an inner product of the acceleration signals on the individual axes and the direction vector; and a detection argument setting unit to determine the detection argument in accordance with the acceleration signals on the individual axes, and to give information about the detection argument to the direction vector setting unit.

An active noise-control device in accordance with the present invention is one that causes a speaker to output a control signal for silencing vibration noise from a vibration noise source, and that receives an error signal between the vibration noise a microphone detects and the control signal, and an acceleration signal of the vibration noise source an acceleration sensor detects, the active noise-control device comprising: a direction vector setting unit to set a direction vector in accordance with a detection argument that defines a target detection direction in a three-axis or two-axis rectangular coordinate system whose individual axes are orthogonal to each other; and an inner product calculator to calculate an inner product of acceleration signals on the individual axes of the rectangular coordinate system received from the acceleration sensor and the direction vector, and to obtain a detected acceleration signal resulting from converting the acceleration signals on the individual axes into the target detection direction; a filter to control the control signal by filtering the detected acceleration signal; and a detection argument setting unit, according to a gradient of power of the error signal with respect to the detection argument, which gradient is calculated in accordance with at least the acceleration signals on the individual axes, the error signal, and filter coefficients of the filter, determines an update amount of the detection argument so as to reduce the power of the error signal, successively updates the detection argument according to the update amount, obtains the detection argument at a time when the power of the error signal becomes minimum, and gives information about the detection argument to the direction vector setting unit, wherein the active noise-control device controls the control signal in response to the error signal and the detected acceleration signal.

Advantages of the Invention

According to the present invention, it is configured in such a manner as to set the direction vector in accordance with the detection argument, and to calculate the inner product of the direction vector and the acceleration signals of the three or two axes which are orthogonal to each other to obtain the detected acceleration signal. Accordingly, it can reduce the sensitivity to the accelerations in the directions other than the direction of motion of the vibration to be detected, and can detect the acceleration of the target vibration accurately. In addition, since it sets the direction vector in accordance with the detection argument, it can detect the acceleration of the target vibration quickly in accordance with a new detection argument even if the direction of motion of the target vibration varies.

According to the present invention, it obtains the acceleration of the vibration component that greatly contributes to the noise as the detected acceleration signal from among the vibration components of the vibration noise source, and carries out the active noise control in accordance with the detected acceleration signal. Thus it can curb the influence of the vibration components that do not contribute to the noise, and improve the silencing effect.

BEST MODE FOR CARRYING OUT THE INVENTION

The best mode for carrying out the invention will now be described with reference to the accompanying drawings to explain the present invention in more detail.

Embodiment 1

In an embodiment 1, an acceleration detector will be described which detects, when the direction of motion of vibration to be detected is clear in advance, the acceleration in the direction of the motion accurately.

Figure 1:
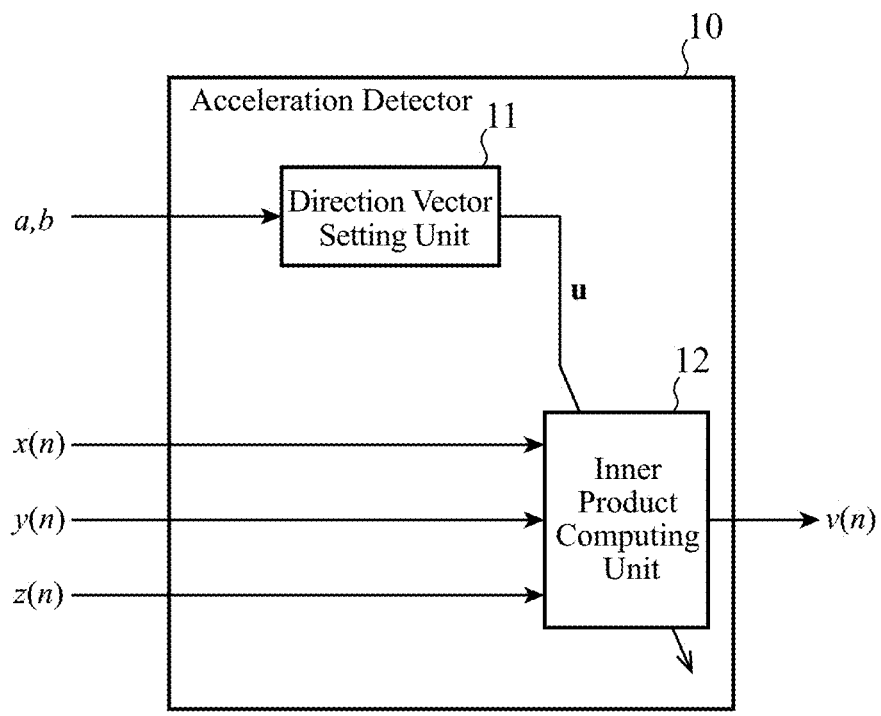
FIG. 1 is a block diagram showing a configuration of an acceleration detector of an embodiment 1 in accordance with the present invention.

FIG. 1 is a block diagram showing a configuration of an acceleration detector 10 of the embodiment 1 in accordance with the present invention. In the embodiment 1, although the acceleration detector that detects the acceleration in a target direction from accelerations of three axes which are orthogonal to each other will be described as an example, those skilled in the art will be able to configure an acceleration detector that detects the acceleration in the target direction from the accelerations of two axes which are orthogonal to each other by using the same means as the present embodiment 1. Accordingly, it is obvious that such a configuration is included within the scope of the present invention as well.

In FIG. 1, the acceleration detector 10 is comprised of a direction vector setting unit 11 to set a direction vector u in compliance with detection arguments a and b given in advance, and an inner product computing unit 12 to calculate an inner product of the direction vector u and three-axis acceleration signals x(n), y(n) and z(n), and obtains acceleration (referred to as "detected acceleration signal" from now on) v(n) in the direction of motion of the vibration to be detected.

The acceleration detector 10 is comprised of a CPU (Central Processing Unit) not shown in the drawing, for example, and the CPU implements the functions of the direction vector setting unit 11 and inner product computing unit 12 by executing programs stored in its internal memory.

In addition, the acceleration signals x(n), y(n) and z(n) input to the acceleration detector 10 can be acquired from the output of an acceleration sensor, for example.

Figure 2:
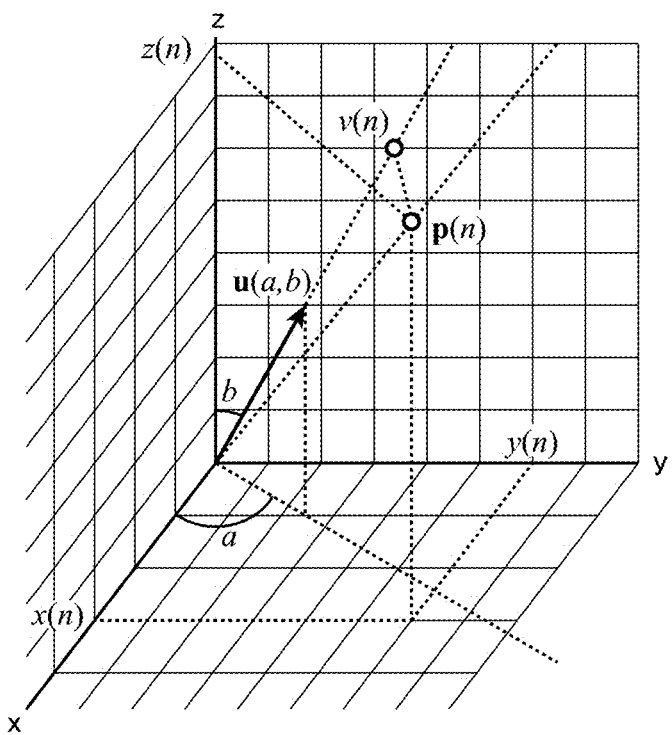
FIG. 2 is a graph illustrating the operation of the acceleration detector of the embodiment 1.

FIG. 2 is a graph illustrating the operation of the acceleration detector 10, and illustrates detection arguments a and b, a direction vector u, observation values x(n), y(n) and z(n) of the accelerations of the individual axes and their observation vector p, and detected acceleration v(n) shown in the three-dimensional coordinate system consisting of the three axes x, y and z which are orthogonal to each other.

The detection arguments a and b input to the direction vector setting unit 11 are angles that determine the direction of the vibration to be detected in the three-dimensional coordinate system. More specifically, the detection argument a is an angle the orthogonal projection vector of the direction vector u onto the xy plane forms with the x axis, and the detection argument b is an angle the direction vector u forms with the z axis. As for the detection arguments a and b, it is assumed that values determined in accordance with the direction of the motion of the vibration to be detected are input. It is further assumed here, however, that $0 \leq a < 2\pi$ and $0 \leq b < \pi$ for convenience of explanation.

For example, in the active noise control, the detection arguments a and b are determined in accordance with the direction of motion of the vibration component with the maximum contribution to noise.

Using the input detection arguments a and b, the direction vector setting unit 11 sets the direction vector u as defined in Expression (1), and supplies it to the inner product computing unit 12.

$$u = \begin{pmatrix} \cos a \sin b \\ \sin a \sin b \\ \cos b \end{pmatrix} \quad (1)$$

The inner product computing unit 12 calculates the inner product of the observation vector p shown by Expression (2), which has as its components the acceleration signals x(n), y(n) and z(n) corresponding to the three axes xyz that are orthogonal to each other, and the direction vector u output from the direction vector setting unit 11 in accordance with Expression (3), thereby computing the detected acceleration signal v(n) which is equal to the acceleration in the direction of motion the direction vector u indicates.

$$p = \begin{pmatrix} x(n) \\ y(n) \\ z(n) \end{pmatrix} \quad (2)$$

$$v(n) = u^T p \quad (3)$$
$$= x(n)\cos a \sin b + y(n)\sin a \sin b + z(n)\cos b$$

Here, the acceleration signals x(n), y(n) and z(n) are acquired from the output of the acceleration sensor or the like. Incidentally, if the acceleration signals acquired are of only two axes xy which are orthogonal to each other, since the detection argument b is limited to π/2, the inner product computing unit 12 calculates the detected acceleration signal v(n) in accordance with Expression (4).

$$v(n) = x(n)\cos a + y(n)\sin a \quad (4)$$

A sign of the detected acceleration signal v(n) calculated by the foregoing Expression (3) or Expression (4) is positive when the displacement is the same direction as the direction vector u, and is negative when the displacement is the reverse direction.

If the direction vector u' in the reverse direction given by Expression (5) is used instead of the direction vector u, the detected acceleration signal v(n) with the opposite sign is obtained simply.

When the sign of the detected acceleration signal v(n) is not important, either the direction vector u or u' is usable.

$$u' = \begin{pmatrix} \cos(a-\pi)\sin(-b+\pi) \\ \sin(a-\pi)\sin(-b+\pi) \\ \cos(-b+\pi) \end{pmatrix} \quad (5)$$
$$= -u$$

Figure 3:
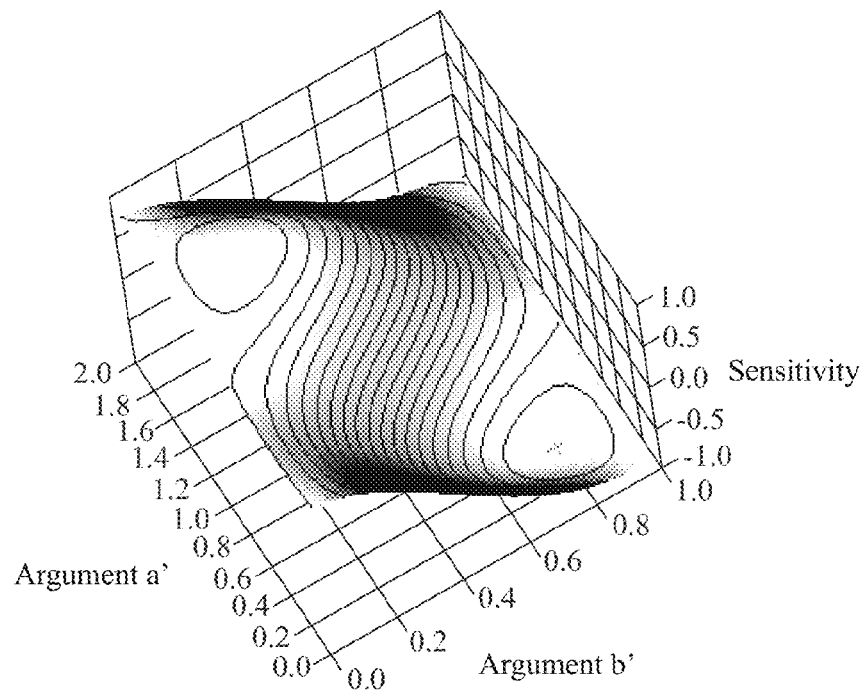
FIG. 3 is a three-dimensional graph illustrating, when detection arguments are determined, an example of detection sensitivity of the acceleration detector to accelerations in directions of $0 \leq a' < 2\pi$ and $0 \leq b' < \pi$.

FIG. 3 is a three-dimensional graph illustrating an example of the detection sensitivity of the acceleration detector 10 for the accelerations in the individual directions of 0≤a'<2π and 2≤b'<π when the detection arguments (a, b) are determined as (a, b)=(1.4π, 0.2π) [rad].

Here, the detection sensitivity is computed according to Expression (6).

(detection sensitivity)=(detected acceleration)/(acceleration in direction of argument a', b') (6)

As shown in FIG. 3, the detection sensitivity takes the maximum value 1 at (a', b')=(1.4π, 0.2π) [rad], and takes the minimum value −1 at (a', b')=(0.4π, 0.8π) [rad], and the absolute value of the detection sensitivity is lower at the other directions.

Thus, it is clear that the detection sensitivity of the acceleration is higher in the direction vector u and its opposite direction −u, and the detection sensitivity in the other directions is lower.

As described above, according to the acceleration detector 10 of the embodiment 1, it is configured in such a manner that the direction vector setting unit 11 sets the direction vector in accordance with the input detection arguments, and the inner product computing unit 12 obtains the detected acceleration signal by computing the inner product of the acceleration signals of the three or two axes orthogonal to each other and the direction vector. Thus, it can reduce the sensitivity to the acceleration other than the direction of motion of the vibration to be detected, and can accurately detect the acceleration of the target vibration.

In addition, according to the acceleration detector 10 of the embodiment 1, it is configured in such a manner that the direction vector setting unit 11 sets the direction vector in accordance with the input detection arguments. Accordingly, even if the direction of motion of the vibration to be detected varies, it can receive the new detection arguments and can quickly detect the acceleration of the target vibration.

Embodiment 2

Although the foregoing embodiment 1 sets the direction vector in accordance with the input detection arguments, a configuration will be described in the embodiment 2, which determines the direction vector in accordance with the acceleration signals of three or two axes that are orthogonal to each other.

Figure 4:
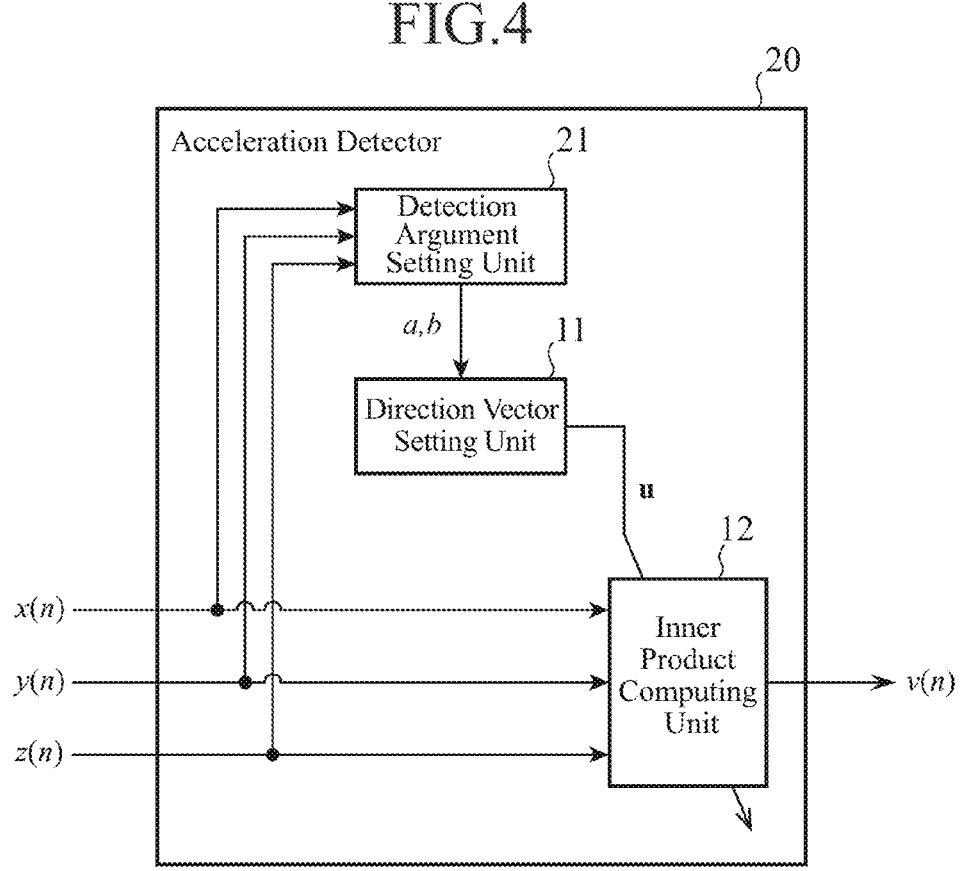
FIG. 4 is a block diagram showing a configuration of an acceleration detector of an embodiment 2 in accordance with the present invention.

FIG. 4 is a block diagram showing a configuration of an acceleration detector 20 of the embodiment 2. In FIG. 4, the acceleration detector 20 is comprised of the direction vector setting unit 11, the inner product computing unit 12, and a detection argument setting unit 21 to determine the detection arguments a and b from the acceleration signals x(n), y(n) and z(n) of the three axes that are orthogonal to each other.

Here, since the direction vector setting unit 11 and inner product computing unit 12 designated by the same reference numerals as those of FIG. 1 are the same components as the direction vector setting unit 11 and inner product computing unit 12 of the acceleration detector 10 of the foregoing embodiment 1, their description will be omitted.

Next, the operation of the acceleration detector 20 will be described.

The detection argument setting unit 21 receives the acceleration signals of three or two axes that are orthogonal to each other, and determines the detection arguments a and b in such a manner that the average power of the detected acceleration signal v(n) becomes maximum. For example, since the sound pressure of vibration noise is proportional to the magnitude of acceleration of an object that vibrates in the active noise control, it is conceivable that the vibration component with the maximum power has the maximum contribution to the noise. Accordingly, determining the detection arguments a and b as described above will enable detecting the acceleration of the relevant vibration component. In addition, in other applications, when the detection of the vibration component with the maximum power is important, the acceleration detector 20 is applicable.

Here, a method will be described which obtains the detection arguments a and b that will achieve the detected acceleration signal v(n) with the maximum average power for the acceleration signals x(n), y(n) and z(n) of the three axes that are orthogonal to each other.

Maximizing the average power $E[v^2(n)]$ of the detected acceleration signal v(n) for the detection arguments a and b is possible by obtaining the gradients of $E[v^2(n)]$ for a and b, followed by successively updating the detection arguments a and b by Expression (7) and Expression (8) using the values resulting from multiplying the gradients by a prescribed constant as the update amount.

$$a(n+1) = a(n) + \mu \frac{\partial}{\partial a} E[v^2(n)] \quad (7)$$
$$= a(n) + \mu \{-(\sigma_x^2 - \sigma_y^2)\sin 2a(n)\sin^2 b(n) + 2\sigma_{xy}\cos 2a(n)\sin^2 b(n) - (\sigma_{xz}\sin a(n) - \sigma_{yz}\cos a(n))\sin 2b(n)\}$$

-continued $$b(n+1) = b(n) + \mu \frac{\partial}{\partial b} E[v^2(n)] \qquad (8)$$
$$= b(n) + \mu\{(\sigma_x^2 \cos^2 a(n) + \sigma_y^2 \sin^2 a(n) - \sigma_z^2 + \sigma_{xy}\sin 2a(n))\sin 2b(n) + 2(\sigma_{xz}\cos a(n) + \sigma_{yz}\sin a(n))\cos 2b(n)\}$$

Where $\mu$ is a prescribed constant satisfying $\mu > 0$, $\sigma_x^2$, $\sigma_y^2$ and $\sigma_z^2$ are average power of x(n), y(n) and z(n), $\sigma_{xy}$ is a correlation coefficient between x(n) and y(n), $\sigma_{xz}$ is one between x(n) and z(n), $\sigma_{yz}$ is one between y(n) and z(n), which are given by the following Expressions (9) and (10).

$$\sigma_x^2 = E[x^2(n)], \sigma_y^2 = E[y^2(n)], \sigma_z^2 = E[z^2(n)] \qquad (9)$$

$$\sigma_{xy} = E[x(n)y(n)], \sigma_{xz} = E[x(n)z(n)], \sigma_{yz} = E[y(n)z(n)] \qquad (10)$$

In the foregoing Expressions, $E[\cdot]$ denotes an averaging operation. As for these averages, a method of computing them using moving averages as given by Expression (11) has been known for an actual device.

$$P_x(n+1) = \lambda P_x(n) + (1-\lambda)x^2(n) \qquad (11)$$

Here, $P_x(n)$ is a computed value of $\sigma_x^2$, and $\lambda$ is a smoothing coefficient satisfying $0 < \lambda < 1$.

The foregoing Expression (7) and Expression (8) are expressions that obtain gradients of the detection arguments a(n) and b(n) with respect to $E[v^2(n)]$, multiply the gradients by an arbitrary constant $\mu$, and add the results to the original values as the update amounts, thereby updating the values. As a result, a(n) and b(n) are updated recursively so as to increase $E[v^2(n)]$, and finally converge to such a(n) and b(n) that will maximize $E[v^2(n)]$.

Incidentally, when the acceleration signals acquired from the acceleration sensor are only two axes xy orthogonal to each other, the detection argument b is limited to $\pi/2$. Thus, it is enough for the detection argument setting unit 21 to update the detection argument a(n) according to Expression (12).

$$a(n+1) = a(n) + \mu\{-(\sigma_x^2 - \sigma_y^2)\sin 2a(n) + 2\sigma_{xy}\cos 2a(n)\} \qquad (12)$$

In addition, if the acceleration signals acquired are only two axes xy orthogonal to each other, it is also possible to determine the detection argument a according to the following Expression (13) which gives an analytic solution of the detection argument a that will maximize $E[v^2(n)]$ without performing the successive update.

$$a = \frac{1}{2}\left\{\pi - \arctan\frac{-(\sigma_x^2 - \sigma_y^2)}{2\sigma_{xy}}\right\} \qquad (13)$$

The direction vector setting unit 11 determines the direction vector u in accordance with the detection arguments a(n) and b(n), which are determined by any one of the foregoing methods, so that the detected acceleration signal v(n) output from the inner product computing unit 12 represents the acceleration of the vibration component with the maximum power.

As described above, according to the acceleration detector 20 of the embodiment 2, it is configured in such a manner that the detection argument setting unit 21 determines the detection arguments in accordance with the acceleration signals of three or two axes which are orthogonal to each other. Accordingly, even if the direction of motion of the vibration to be detected is unknown, it is able to detect its acceleration.

In addition, according to the acceleration detector 20 of the embodiment 2, it is configured in such a manner that the detection argument setting unit 21 determines the detection arguments in accordance with the average powers and correlation coefficients of the acceleration signals. Accordingly, it can suppress fluctuations of the detection arguments due to instantaneous disturbance in the acceleration signals, and can stably detect the direction of motion of the target vibration and its acceleration.

In addition, according to the acceleration detector 20 of the embodiment 2, it is configured in such a manner that the detection argument setting unit 21 determines the detection arguments in such a manner as to maximize the average amplitude of the detected acceleration signal. Accordingly, it can obtain the direction and acceleration of the vibration component with the maximum power.

Furthermore, according to the acceleration detector 20 of the embodiment 2, it is configured in such a manner that as for the detection arguments computed in accordance with the average powers of the acceleration signals and their correlation coefficients, it determines the update amounts in accordance with the gradients of the magnitude of the detected acceleration signal with respect to the detection arguments, and successively updates the detection arguments according to the update amounts. Accordingly, even if steady-state disturbance is mixed into the acceleration signals, the present embodiment 2 can detect the direction of motion and acceleration of the target vibration accurately.

Embodiment 3

In the embodiment 3, a configuration of an active noise-control device using an acceleration detector in accordance with the present invention will be described.

Figure 5:
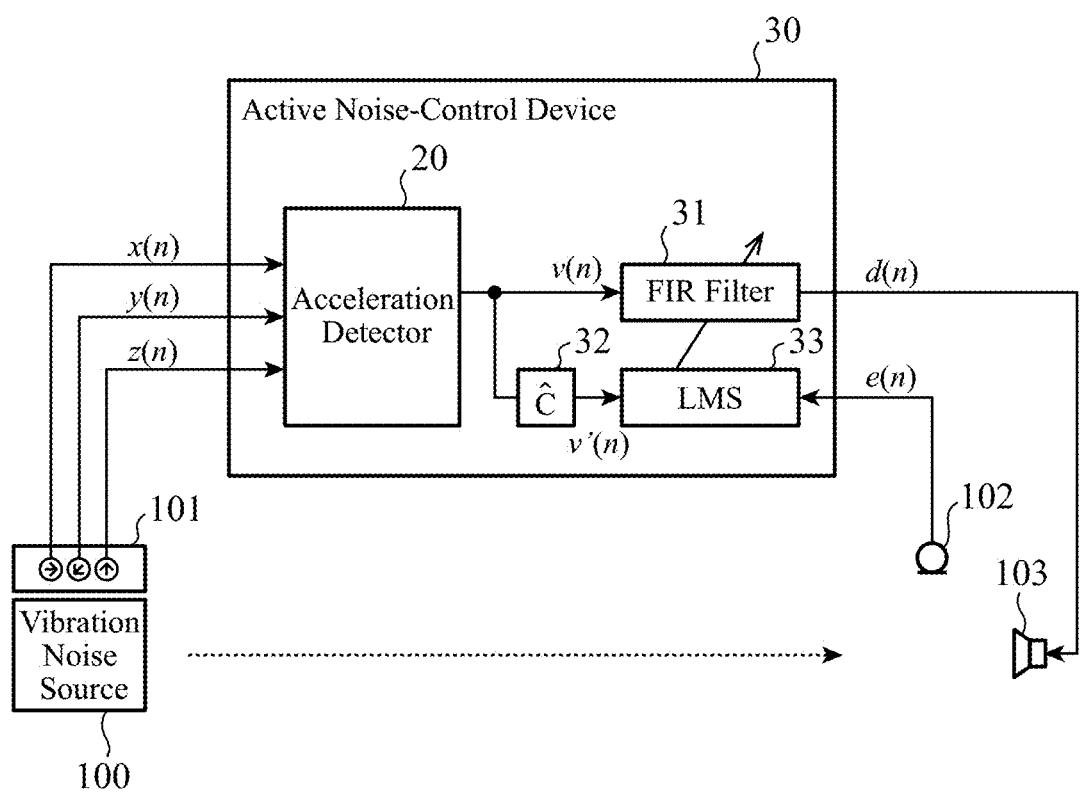
FIG. 5 is a block diagram showing a configuration of an active noise-control device of an embodiment 3 in accordance with the present invention.

FIG. 5 is a block diagram showing a configuration of an active noise-control device 30 of the embodiment 3. In FIG. 5, the active noise-control device 30 is comprised of the acceleration detector 20, an FIR (Finite Impulse Response) filter 31, a secondary path filter 32, and an LMS (Least Mean Square) processing unit 33. In addition, the active noise-control device 30 is connected to an acceleration sensor 101 mounted on a vibration noise source 100 that generates vibration noise, an error detection microphone 102, and a speaker 103.

Here, the acceleration detector 20 is the acceleration detector described in the foregoing embodiment 2, which is designated by the same reference numeral in FIG. 4. If appropriate detection arguments a and b can be input from the outside, the acceleration detector 20 can be replaced by the acceleration detector 10 described in the foregoing embodiment 1.

Next, the external operation of the active noise-control device 30 will be described.

The active noise-control device 30 receives the acceleration signals x(n), y(n) and z(n) of the three axes xyz orthogonal to each other, which are output from the acceleration sensor 101 mounted on the vibration noise source 100 that produces the vibration noise, and outputs a control signal d(n) for canceling the noise generated by the vibration noise source 100 (shown by a broken line arrow in FIG. 5). The control signal d(n) is output from the speaker 103 to interfere with the noise in space. If the output noise from the speaker 103 is true antiphase noise in space, the noise is canceled out and silencing effect is achieved. The error detection microphone 102 detects the cancellation error, and outputs an error signal e(n). The error signal e(n) is input to the active noise-control device 30 so that the active noise-control device 30 controls the control signal d(n) in order to reduce the cancellation error.

Next, the internal operation of the active noise-control device 30 will be described.

The acceleration signals x(n), y(n) and z(n) the acceleration sensor 101 outputs are input to the acceleration detector 20 of the active noise-control device 30. As described in the foregoing embodiment 2, the acceleration detector 20 detects the acceleration of the vibration component with the maximum power in the vibration of the vibration noise source 100, and outputs it as the detected acceleration signal v(n).

The detected acceleration signal v(n) is supplied to the FIR filter 31 that filters it with the filter coefficients the FIR filter 31 holds, and outputs the control signal d(n). In addition, the secondary path filter 32 filters the detected acceleration signal v(n) with the filter coefficients simulating the acoustic transfer characteristics from the speaker 103 to the error detection microphone 102, and supplies its output v'(n) to the LMS processing unit 33.

According to the error signal e(n) supplied from the error detection microphone 102 and the detected acceleration signal v'(n) filtered through the secondary path filter 32, the LMS processing unit 33 updates the filter coefficients of the FIR filter 31 so as to reduce the cancellation error.

A series of signal processing steps by means of the FIR filter 31, secondary path filter 32 and LMS processing unit 33 is known as a FilteredX-LMS system, and is disclosed, for example, in Masaharu Nishimura and so on, "ACTIVE NOISE CONTROL", pp. 74-76, CORONA PUBLISHING CO., LTD., published Jul. 7, 2006 in Japan.

The present invention, however, is not limited to an active noise-control device using the Filtered X-LMS system. For example, it is applicable to an active noise-control device using other adaptive algorithms, or to an active noise-control device in which the filter coefficients of the FIR filter 31 are optimized in advance and are not updated. As for such active noise-control devices, although it is conceivable that there are some cases where their configurations differ from the foregoing active noise-control device 30, as long as they have a configuration of the acceleration detector 10 or 20 of the present invention, they are considered to be included within the scope of the present invention.

As described above, according to the active noise-control device 30 of the embodiment 3, it detects the acceleration of the vibration component with the major contribution to the noise in the vibration components of the vibration noise source 100, and curbs the influence of the vibration components that do not contribute to the noise by carrying out the active noise control in accordance with the acceleration detected, thereby being able to improve the silencing effect.

Embodiment 4

Although the foregoing embodiment 3 determines the detection arguments in such a manner as to maximize the power of the detected acceleration signal, a configuration will be described in the present embodiment 4, which determines the detection arguments in such a manner as to minimize the power of the error signal detected with the microphone.

Figure 6:
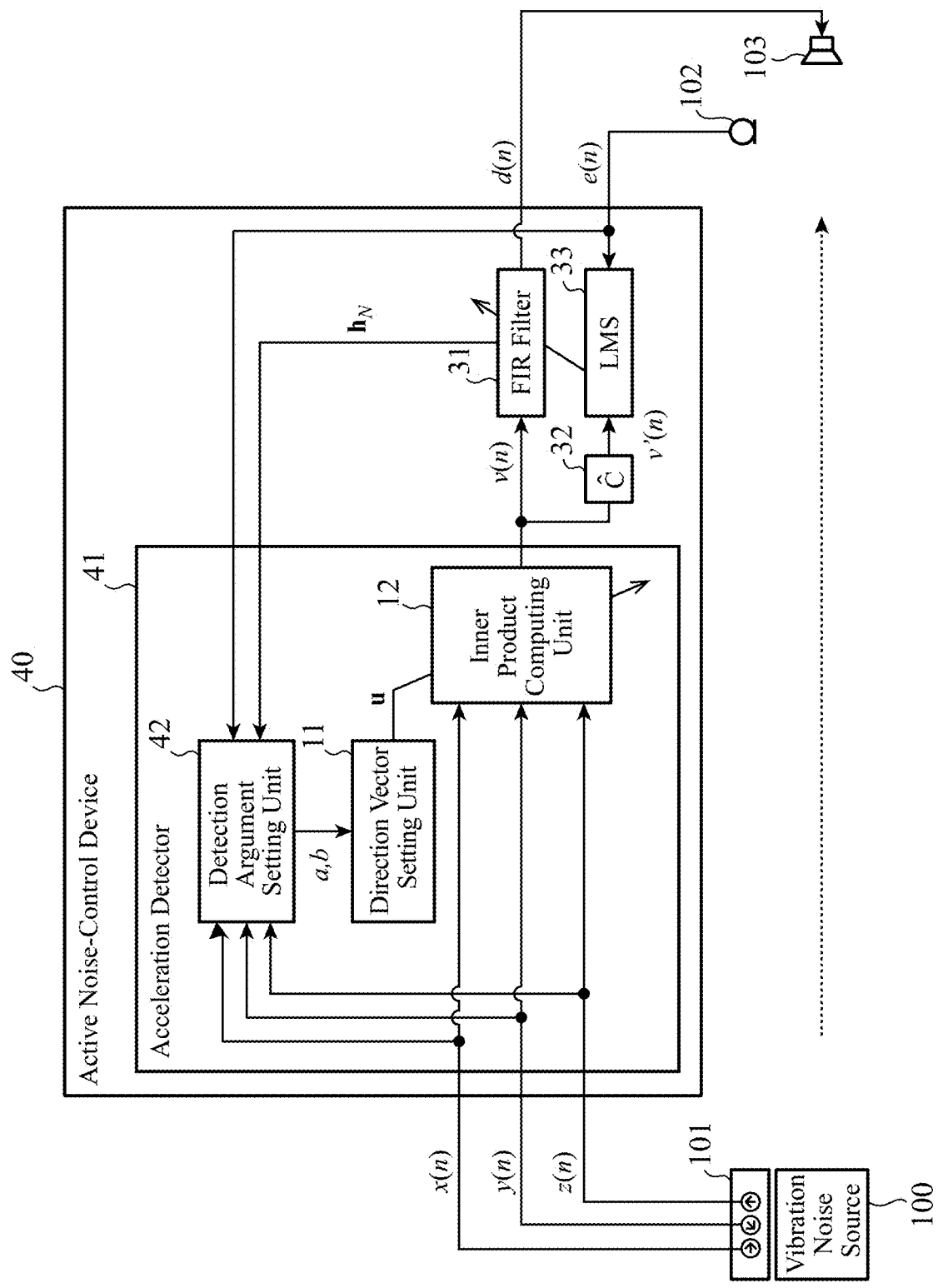
FIG. 6 is a block diagram showing a configuration of an active noise-control device of an embodiment 4 in accordance with the present invention.

FIG. 6 is a block diagram showing a configuration of an active noise-control device 40 of the embodiment 4. In FIG. 6, the active noise-control device 40 is comprised of an acceleration detector 41, the FIR filter 31, the secondary path filter 32 and the LMS processing unit 33. In addition, the active noise-control device 40 is connected to the acceleration sensor 101 mounted on the vibration noise source 100, the error detection microphone 102 and the speaker 103. In addition, the acceleration detector 41 is comprised of a detection argument setting unit 42, the direction vector setting unit 11, and the inner product computing unit 12. In FIG. 6, the same components as those of FIG. 1-FIG. 5 of the foregoing embodiments 1-3 are designated by the same reference numerals and their detailed description will be omitted.

Next, the operation of the active noise-control device 40 will be described.

The detection argument setting unit 42, a part of the acceleration detector 41, is supplied with the acceleration signals x(n), y(n) and z(n) the acceleration sensor 101 outputs, the error signal e(n) the error detection microphone 102 outputs, and filter coefficients $h_N$ the FIR filter 31 retains.

The detection argument setting unit 42 obtains the gradients of the power $e^2(n)$ of the error signal e(n) with respect to the detection arguments a and b, determines the update amounts of the detection arguments a and b so as to reduce the power $e^2(n)$ in accordance with the gradients, updates the two detection arguments, and supplies them to the direction vector setting unit 11.

The gradients of the error signal power $e^2(n)$ with respect to the detection arguments a and b are given by the following Expression (14) and Expression (15).

$$\frac{\partial e^2(n)}{\partial a} = 2e(n)\sum_{k=0}^{N-1} h_k c_M^T \{x_M(n-k)\sin a \sin b + y_M(n-k)\cos a \sin b\} \quad (14)$$

$$\frac{\partial e^2(n)}{\partial b} = -2e(n)\sum_{k=0}^{N-1} h_k c_M^T \quad (15)$$

$$\{x_M(n-k)\cos a \cos b + y_M(n-k)\sin a \cos b - z_M(n-k)\sin b\}$$

Here, $h_k$(k=0, 1, . . . , N−1) are filter coefficients of the FIR filter 31, $c_M$ is an impulse response train indicating the transfer characteristics of the secondary path corresponding to the coefficient sequence of the secondary path filter 32, $x_M(n)$ is a vector having the acceleration signals x(n) as its components, $y_M(n)$ is a vector having the acceleration signals y(n) as its components, and $z_M(n)$ is a vector having the acceleration signals z(n) as its components, and they are given by the following Expressions (16), (17), (18) and (19).

$$c_M = [c_0, c_1, \ldots, c_{M-1}]^T \quad (16)$$

$$x_M(n) = [x(n), x(n-1), \ldots, x(n-M+1)]^T \quad (17)$$

$$y_M(n) = [y(n), y(n-1), \ldots, y(n-M+1)]^T \quad (18)$$

$$z_M(n) = [z(n), z(n-1), \ldots, z(n-M+1)]^T \quad (19)$$

Incidentally, T designates a transposition symbol.

The detection argument setting unit 42 computes the update amounts of the detection arguments a and b by multiplying the gradients given by Expression (20) and Expression (21) by a prescribed constant μ (0<μ), and updates the detection arguments a and b recursively, thereby converging them to the detection arguments a and b that will minimize the power $e^2(n)$ of the error signal e(n).

$$a(n+1) = a(n) - 2\mu e(n) \qquad (20)$$
$$\sum_{k=0}^{N-1} h_k c_M^T \{x_M(n-k)\sin a(n)\sin b(n) - y_M(n-k)\cos a(n)\sin b(n)\}$$

$$b(n+1) = \qquad (21)$$
$$b(n) + 2\mu e(n) \sum_{k=0}^{N-1} h_k c_M^T \{x_M(n-k)\cos a(n)\cos b(n) + y_M(n-k)$$
$$\sin a(n)\cos b(n) - z_M(n-k)\sin b(n)\}$$

In addition, when the acceleration signals acquired from the acceleration sensor 101 are only two axes xy orthogonal to each other, the detection argument b is limited to π/2. Accordingly, Expression (20) is replaced by the following Expression (22).

$$a(n+1) = \qquad (22)$$
$$a(n) - 2\mu e(n) \sum_{k=0}^{N-1} h_k c_M^T \{x_M(n-k)\sin a(n) + y_M(n-k)\cos a(n)\}$$

In addition, when the secondary path can be approximated by a simple delay, the foregoing Expression (20) and Expression (21) can be simplified as the following Expression (23) and Expression (24). In this case, the transfer characteristics of the secondary path do not appear in the formulas explicitly.

$$a(n+1) = a(n) - 2\mu e(n) \qquad (23)$$
$$\sum_{k=0}^{N-1} h_k \{x(n-k-\tau)\sin a(n)\sin b(n) - y(n-k-\tau)\cos a(n)\sin b(n)\}$$

$$b(n+1) = \qquad (24)$$
$$b(n) + 2\mu e(n) \sum_{k=0}^{N-1} h_k \{x(n-k-\tau)\cos a(n)\cos b(n) + y(n-k-\tau)$$
$$\sin a(n)\cos b(n) - z(n-k-\tau)\sin b(n)\}$$

Incidentally, τ is a delay time which satisfies τ≥0.

As described above, according to the active noise-control device 40 of the embodiment 4, it is configured in such a manner that the detection argument setting unit 42 determines the update amounts of the detection arguments in such a manner as to reduce the power of the error signal in accordance with the gradients of the power of the error signal with respect to the detection arguments, which gradients are computed from the acceleration signals on the individual axes provided by the acceleration sensor 101, from the error signal provided by the error detection microphone 102, and from the filter coefficients of the FIR filter 31; and successively updates the detection arguments by the update amounts. Thus, it can automatically select the detection arguments that will minimize the power of the error signal, thereby being able to improve its silencing effect.

In addition, according to the active noise-control device 40 of the embodiment 4, it is configured in such a manner that the detection argument setting unit 42 determines the update amounts of the detection arguments at least in accordance with the transfer characteristics of the secondary path from the speaker 103 to the error detection microphone 102. Thus, even if the secondary path has complicated transfer characteristics which are unable to be approximated by a simple delay, it can automatically select the detection arguments that will minimize the power of the error signal, thereby being able to improve the silencing effect.

Embodiment 5

Although the foregoing embodiment 4 updates the detection arguments in such a manner as to minimize the power of the error signal, a configuration will be described in the present embodiment 5, which adjusts the update processing of the detection arguments and that of the coefficients of the FIR filter to prevent the interference between them.

Since the active noise-control device of the embodiment 5 has the same configuration as the active noise-control device 40 of FIG. 6 with respect to the drawing, the embodiment 5 will be described with reference to FIG. 6.

As shown in FIG. 6, the LMS processing unit 33 and detection argument setting unit 42 carry out the update processing of the filter coefficients of the FIR filter 31 and that of the detection arguments a and b, respectively, so as to reduce the power $e^2(n)$ of the error signal e(n). However, updating them at the same time may sometimes bring about deterioration of the silencing effect because the power of the error signal $e^2(n)$ does not reduce satisfactorily owing to the interference between them.

With respect to such a problem, the silencing effect can be stabilized by carrying out the updates of them alternately, or by slowing down one of the updates by setting a constant by which one of the update amounts is multiplied at a value less than a constant used for the other update amount.

As described above, according to the active noise-control device 40 of the embodiment 4, it carries out the update of the detection arguments and the update of the coefficients of the FIR filter alternately, or performs one of the updates slower than the other by setting the constant by which one of the update amounts is multiplied at a value less than the constant by which the other of the update amounts is multiplied. Thus, it can prevent the deterioration of the silencing effect owing to the interference between the two updates.

Incidentally, it is to be understood that a free combination of the individual embodiments, variations of any components of the individual embodiments or removal of any components of the individual embodiments is possible within the scope of the present invention.

INDUSTRIAL APPLICABILITY

As described above, an acceleration detector in accordance with the present invention is able to detect the acceleration of the target vibration accurately. Accordingly, it is suitable for an application to an active noise-control device to silence the vibration noise of a vibration noise source such as a machine and vehicle having innumerable mode of vibrations.

DESCRIPTION OF REFERENCE SYMBOLS

10, 20, 41 acceleration detector; 11 direction vector setting unit; 12 inner product computing unit; 21, 42 detection argument setting unit; 30, 40 active noise-control device; 31 FIR filter; 32 secondary path filter; 33 LMS processing unit; 100 vibration noise source; 101 acceleration sensor; 102 error detection microphone; 103 speaker.

What is claimed is:

1. An acceleration detector that receives acceleration signals on individual axes observed in a three-axis or two-axis rectangular coordinate system whose individual axes are orthogonal to each other from an acceleration sensor detecting a noise or vibration to be cancelled, and that outputs a detected acceleration signal converted to a target detection direction of vibration to detect directions of vibrations contributing to noise, wherein the acceleration detector accommodates for varying the target detection direction, the acceleration detector comprising:
a direction vector setting unit to set a direction vector in accordance with a detection argument that defines the target detection direction in the rectangular coordinate system;
an inner product calculator to obtain the detected acceleration signal by calculating an inner product of the acceleration signals on the individual axes of the acceleration sensor and the direction vector; and
a detection argument setting unit to determine the detection argument in accordance with the acceleration signals on the individual axes of the acceleration sensor, and to give information about the detection argument to the direction vector setting unit
wherein during measurement of the target detection direction, the direction vector is determined in accordance with the acceleration signals on the individual axes.

2. An acceleration detector that receives acceleration signals on individual axes observed in a three-axis or two-axis rectangular coordinate system whose individual axes are orthogonal to each other from an acceleration sensor detecting a noise or vibration to be cancelled, and that outputs a detected acceleration signal converted to a target detection direction, the acceleration detector comprising:
a direction vector setting unit to set a direction vector to detect directions of noise or vibration in accordance with a detection argument that defines the target detection direction in the rectangular coordinate system;
an inner product calculator to obtain the detected acceleration signal by calculating an inner product of the acceleration signals on the individual axes of the acceleration sensor and the direction vector; and
a detection argument setting unit to determine the detection argument in accordance with the acceleration signals on the individual axes of the acceleration sensor, and to give information about the detection argument to the direction vector setting unit;
wherein the detection argument setting unit determines the detection argument in accordance with at least average powers of the acceleration signals on the individual axes and a correlation coefficient between the acceleration signals on the axes.

3. The acceleration detector according to claim 2, wherein the detection argument setting unit determines the detection argument so as to maximize average power of the detected acceleration signal.

4. The acceleration detector according to claim 3, wherein the detection argument setting unit, according to a gradient of the average power of the detected acceleration signal with respect to the detection argument, which gradient is calculated in accordance with at least the average powers of the acceleration signals on the individual axes and the correlation coefficient between the acceleration signals on the axes, determines an update amount of the detection argument so as to increase the average power of the detected acceleration signal; successively updates the detection argument according to the update amount; and obtains the detection argument at a time when the average power of the detected acceleration signal becomes maximum.

5. An active noise-control device that causes a speaker to output a control signal for silencing vibration noise from a vibration noise source, and that receives an error signal between the vibration noise a microphone detects and the control signal, and an acceleration signal of the vibration noise source an acceleration sensor detects, the active noise-control device comprising:
a direction vector setting unit to set a direction vector in accordance with a detection argument that defines a target detection direction in a three-axis or two-axis rectangular coordinate system whose individual axes are orthogonal to each other;
an inner product calculator to calculate an inner product of acceleration signals on the individual axes of the rectangular coordinate system received from the acceleration sensor and the direction vector, and to obtain a detected acceleration signal resulting from converting the acceleration signals on the individual axes into the target detection direction;
a filter to control the control signal by filtering the detected acceleration signal; and
a detection argument setting unit, according to a gradient of power of the error signal with respect to the detection argument, which gradient is calculated in accordance with at least the acceleration signals on the individual axes, the error signal, and filter coefficients of the filter, determines an update amount of the detection argument so as to reduce the power of the error signal, successively updates the detection argument according to the update amount, obtains the detection argument at a time when the power of the error signal becomes minimum, and gives information about the detection argument to the direction vector setting unit, wherein
the active noise-control device controls the control signal in response to the error signal and the detected acceleration signal.

6. The active noise-control device according to claim 5, wherein
the detection argument setting unit determines the update amount of the detection argument in accordance with transfer characteristics from the speaker to the microphone, in addition to the acceleration signals on the individual axes, the error signal and the filter coefficients of the filter.

7. The active noise-control device according to claim 5, further comprising:
an LMS processor to update the filter coefficients of the filter in accordance with the error signal and the detected acceleration signal, wherein
the detection argument setting unit and the LMS processor perform update processing of the detection argument and update processing of the filter coefficients alternately.

8. The active noise-control device according to claim 5, further comprising:
an LMS processor to update the filter coefficients of the filter in accordance with the error signal and the detected acceleration signal, wherein
one of the detection argument setting unit and the LMS processor performs update processing slowly by setting a constant, by which one of the update amount of the detection argument and the update amount of the filter coefficients is multiplied, at a value less than a constant, by which the other of the update amount of the detection argument and the update amount of the filter coefficients is multiplied.

* * * * *